UNITED STATES PATENT OFFICE.

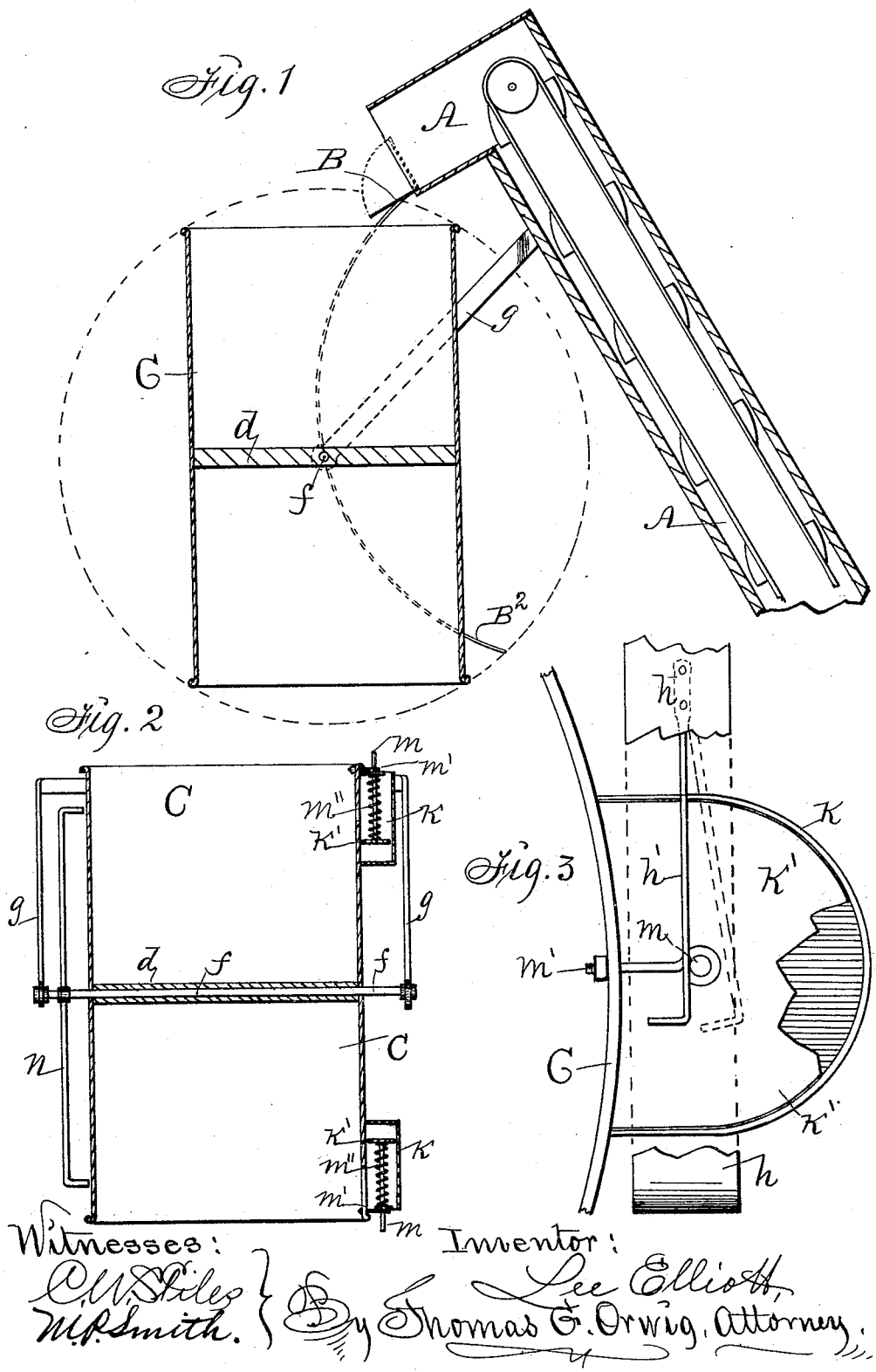

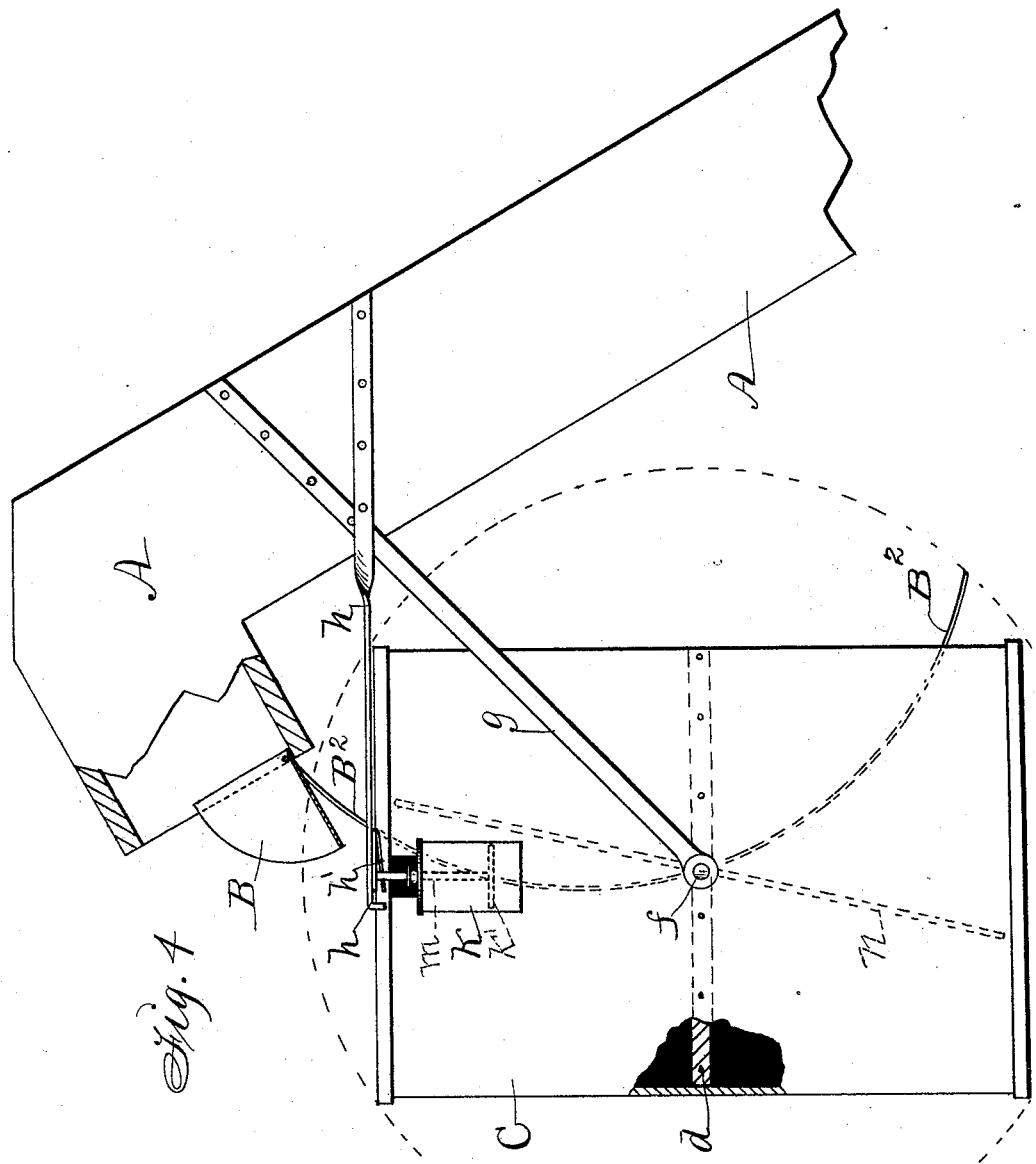

LEE ELLIOTT, OF STUART, IOWA.

GRAIN-METER.

SPECIFICATION forming part of Letters Patent No. 405,833, dated June 25, 1889.

Application filed August 6, 1888. Serial No. 282,116. (No model.)

*To all whom it may concern:*

Be it known that I, LEE ELLIOTT, a citizen of the United States of America, and a resident of Stuart, in the county of Guthrie and State of Iowa, have invented an Improved Automatic Grain-Meter, of which the following is a specification.

My invention consists in the construction and combination of an open-ended duplex measure and operative mechanism with a grain-conveyer, as hereinafter set forth, pointed out in my claims, and illustrated in the accompanying drawings, in which—

Figure 1 is a side view showing the duplex measure suspended under the discharge-spout of a conveyer and in position, as required, to receive grain flowing from the spout. Fig. 2 is a vertical section of the measure, showing the operative devices connected therewith and carried thereby. Fig. 3 is an enlarged top view of a section of the measure and the trip mechanism. Fig. 4 is an enlarged side view of the measure and top portion of a conveyer, showing the devices fixed to the measure and to the conveyer for automatically operating the measure.

A is the discharge-spout of a conveyer, and B is an adjustable chute hinged in the mouth of the spout in such a manner that the chute can be turned up to close the mouth and serve as a cut-off for arresting the flow of grain while the measure is revolving and emptying.

C is an open-ended cylinder, preferably made of sheet metal, and has a fixed diaphragm $d$ at its center, that practically makes it a duplex measure.

$f$ is a shaft fixed to the diaphragm to extend in opposite directions and through bearers $g$, that are fixed to the conveyer in such a manner that the measure will be suspended under the mouth of the conveyer and adjustable chute.

$h$ is a metal bar fixed to the conveyer in such a manner that it will extend horizontally over the top edge of the measure C.

$h'$ is a spring fixed to the under side of the bar $h$ to engage a latching device carried by the measure C.

K are pockets fixed to the outside and opposite ends of the measure C in such a manner that when the measure is full of grain or has received the quantity desired the grain will flow through an opening in the wall of the measure and into the pocket and depress a movable bottom $k'$, that is suspended by means of a rod $m$, that extends up through a guide $m'$ fixed to the measure.

$m''$ is a spring that in its normal condition holds the bottom $k'$ and rod $m$ elevated, as required, to keep the rod in contact with the spring $h'$ and the measure stationary in a vertical position to receive the grain discharged from the conveyer.

$B^2$ is a curved rod or arm fixed on the end of the hinged adjustable chute B.

$n$ are straight arms fixed to the shaft $f$ to extend in opposite directions in the same plane. Their free ends are bent toward the measure C in such a manner that when the measure is full and revolves to empty the arm at the top will come in contact with the curved arm $B^2$ and lift it, as required, to thereby turn up the chute B, to prevent the grain from escaping from the conveyer until the duplex measure is inverted and ready again to receive grain; and as the measure turns and empties the rod $m$ comes in contact with the spring $h'$, and is thereby arrested, as required, to retain the empty vessel perpendicular until the top part is filled and the overflow of grain from the measure into the pocket $k$ depresses the bottom $k'$ and rod $m$, as required, to unlatch and empty the measure. A complete automatic meter for measuring grain in bulk is thus readily combined and operated with a conveyer.

I claim as my invention—

1. The pockets K, fixed to the measure C, the movable bottoms $k'$, having fixed rods $m$, extended through fixed guides $m'$, and the springs $m''$, in combination with the fixed bar $h$ and spring-latch $h'$, substantially as shown and described, for the purposes stated.

2. The open-ended measure C, having a fixed partition or diaphragm $d$, a fixed shaft $f$, fixed pockets K, and fixed guides $m'$, the rods $m$, having fixed bottoms $k'$, the springs $m''$, the arms $n$ and $g$, and the conveyer A, having a hinged chute B, provided with a curved arm $B^2$, arranged and combined to operate in the manner set forth, for the purposes stated.

LEE ELLIOTT.

Witnesses:
A. W. LIVINGSTON,
BEN S. ADAMS.